Figure 1:
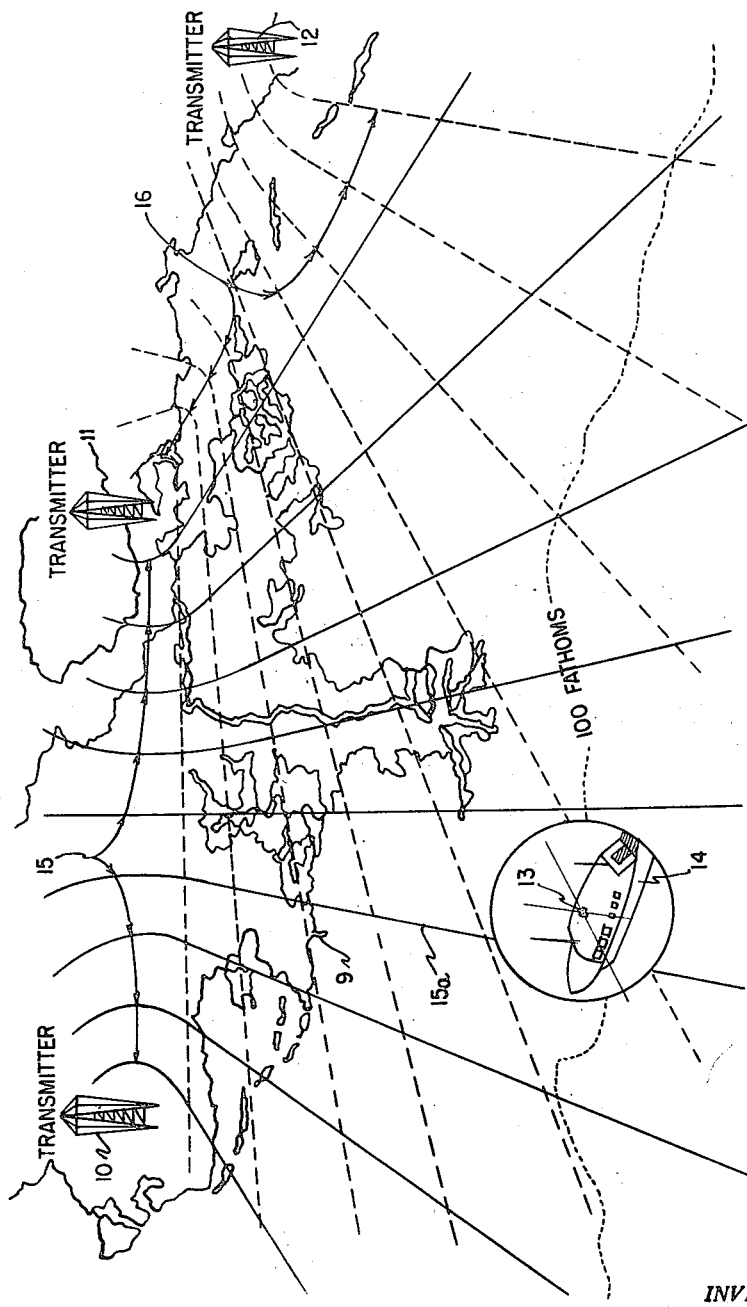

July 4, 1950  J. E. HAWKINS  2,513,315
RADIO POSITION DETERMINING SYSTEM
Filed Oct. 9, 1947  6 Sheets-Sheet 1

INVENTOR.
James E. Hawkins
BY Mason and Wyss
Attys.

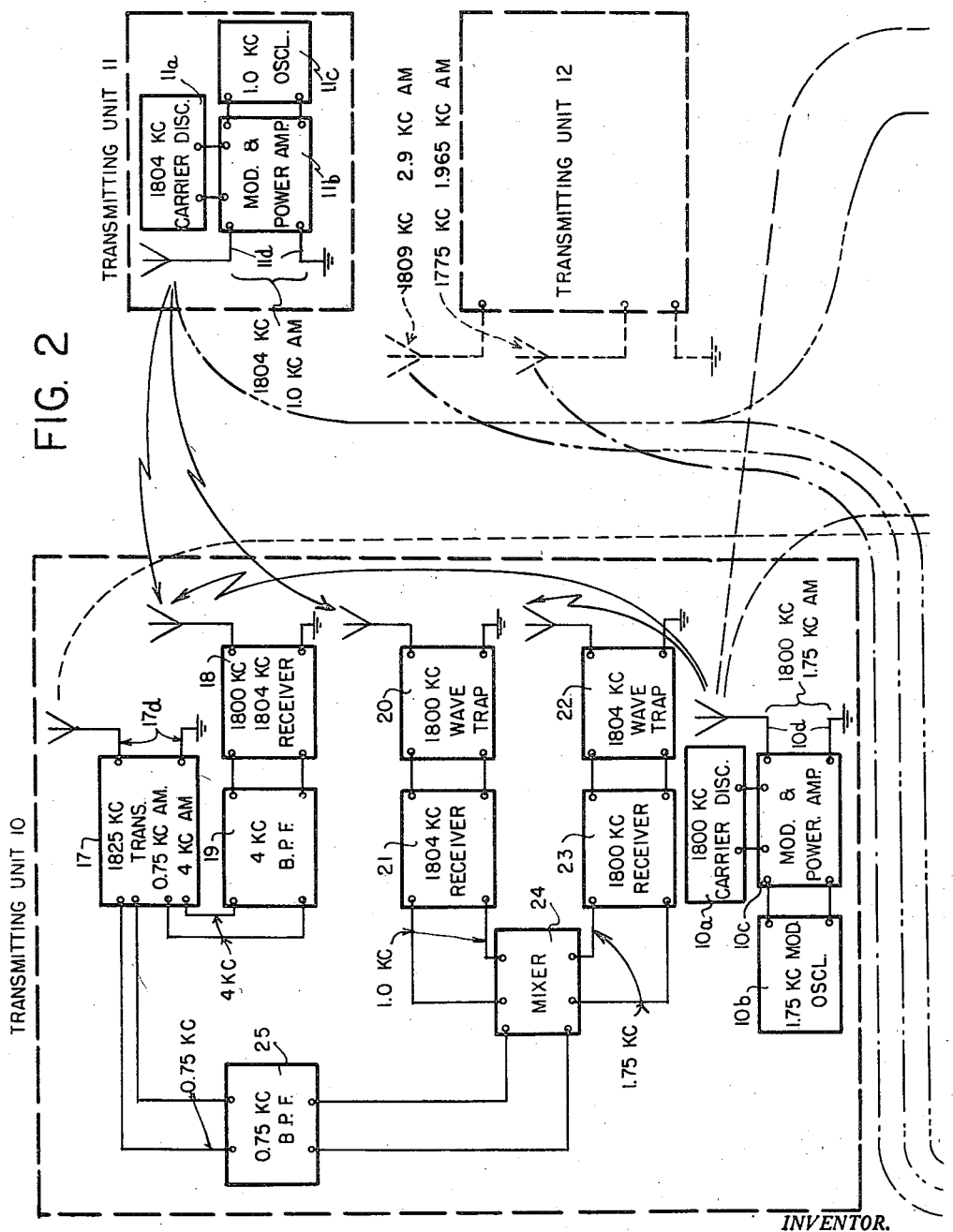

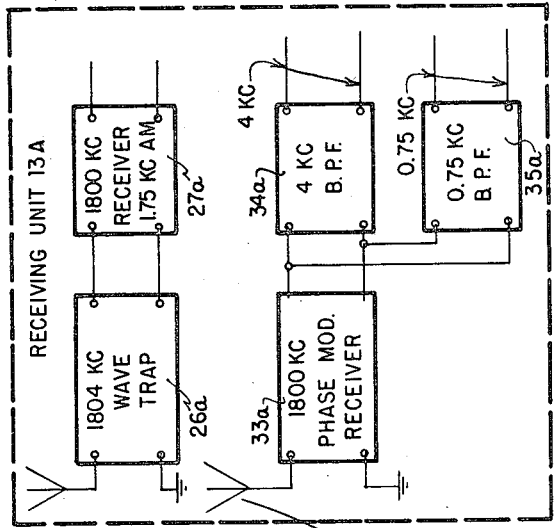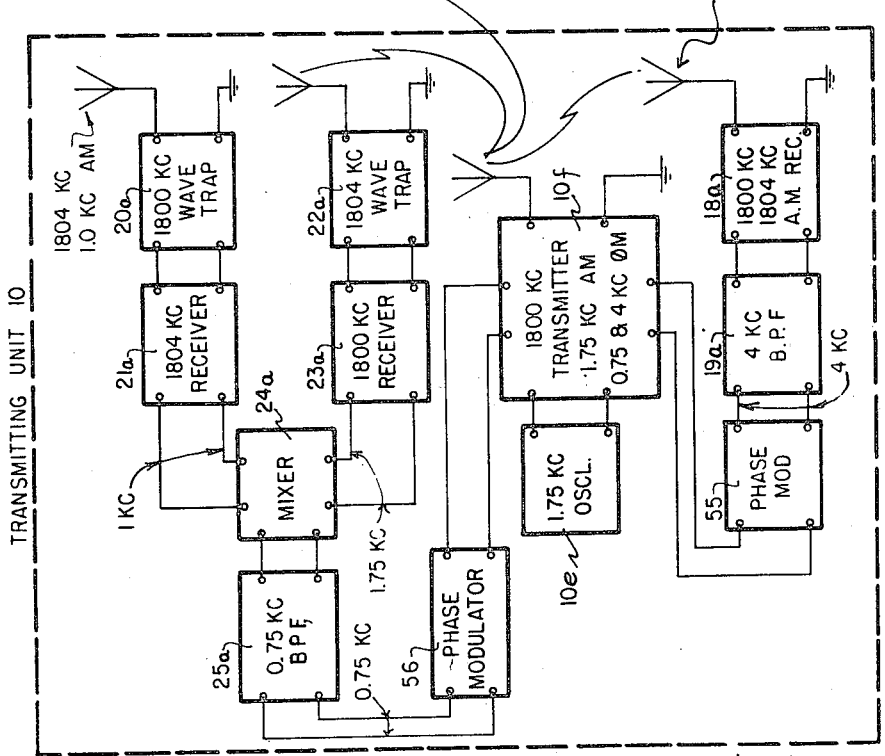

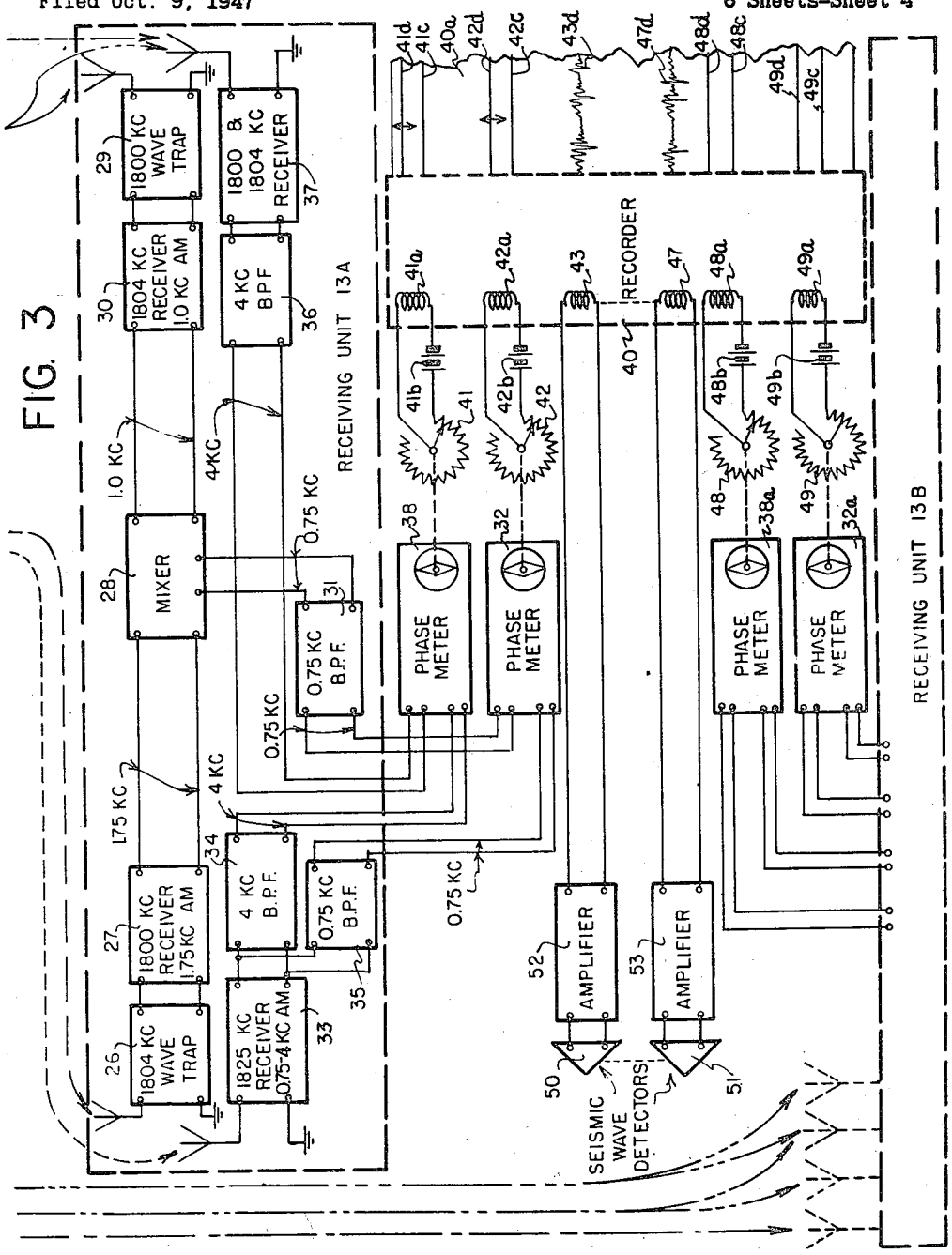

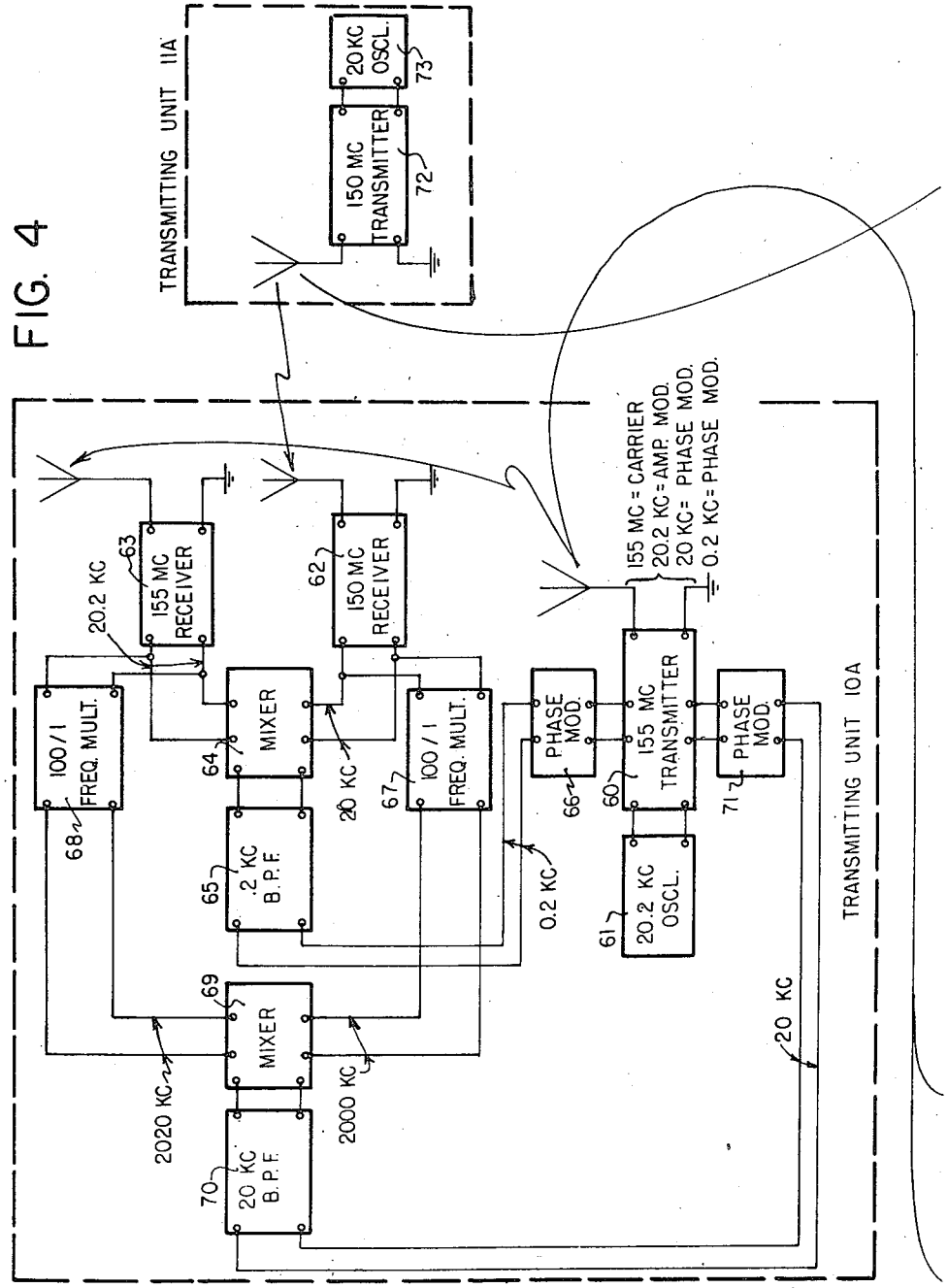

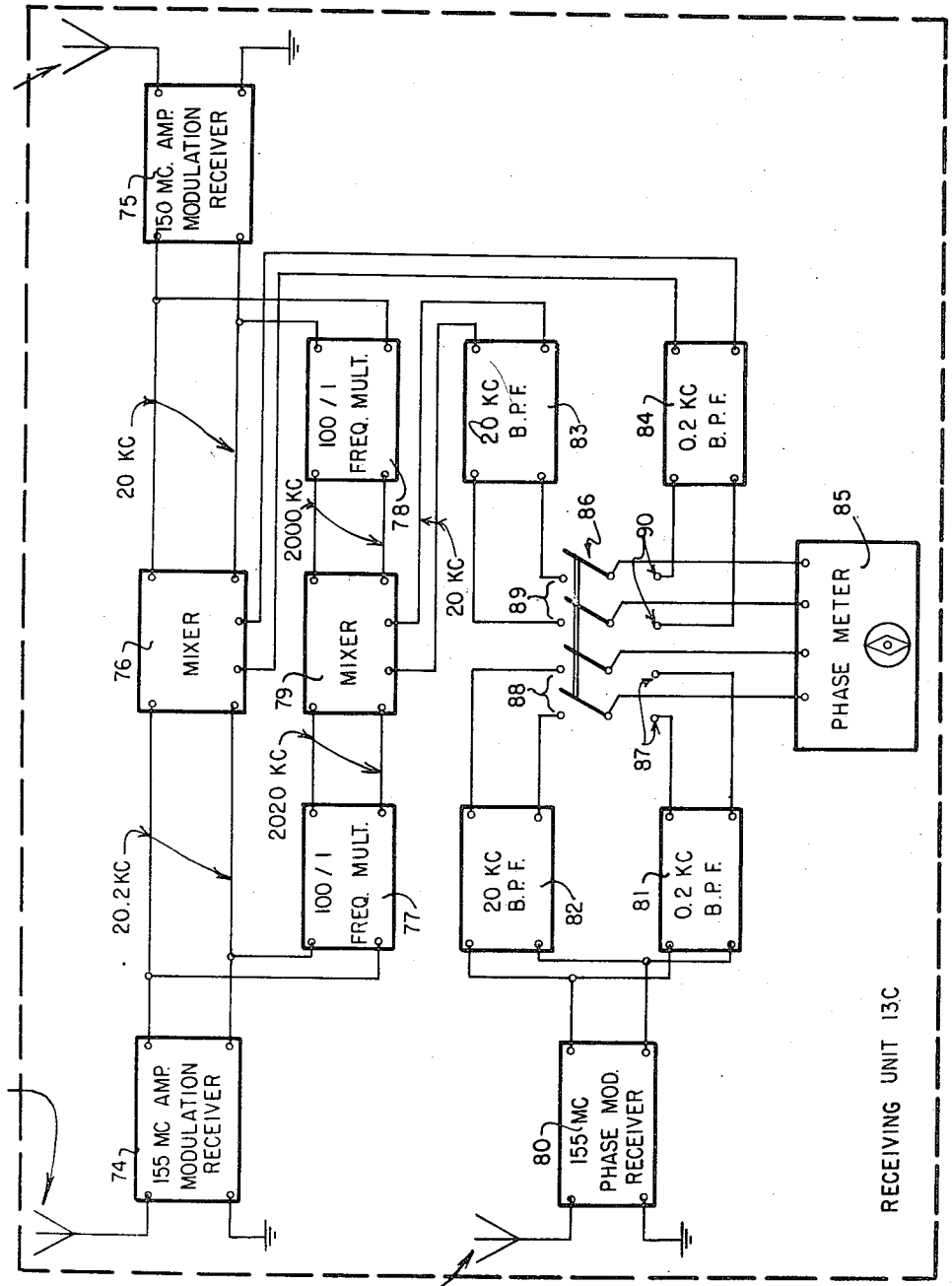

Patented July 4, 1950

2,513,315

UNITED STATES PATENT OFFICE 2,513,315

RADIO POSITION DETERMINING SYSTEM

James E. Hawkins, Tulsa, Okla., assignor to Seismograph Service Corporation, Tulsa, Okla., a corporation of Delaware Application October 9, 1947, Serial No. 778,794

52 Claims. (Cl. 343—105)

The present invention relates to radio position finding systems and more particularly to improvements in radio position finding systems of the type in which continuous wave transmission from a plurality of transmitting points is utilized to produce at an unknown position two or more indications which may be correlated to identify the location of the unknown position.

In certain types of survey work, it is necessary to obtain position data with a high degree of accuracy. Thus, one of the most difficult problems encountered in conducting seismic survey operations over water covered areas is that of accurately determining and recording the positions of the shot and detector points, particularly when the operations are conducted out of sight of land marks located along the shore line. Systems of triangulation employing direction finding equipment of the loop or radio compass types are entirely too inaccurate to produce usable position information for the particular purpose mentioned. At present, pulse-echo radar systems employing targets located at known points along the shore line bounding a water covered area under survey are relied upon in seismic operations on water to obtain the desired position information. Such systems are expensive to obtain and maintain, and must be handled by skilled operators in order to obtain usable information. Further, practically all pulse-echo systems are limited to line-of-sight transmission, due to the high frequencies employed, which materially restricts the usefulness thereof when the systems are to be employed with substantial distances separating the targets from the pulse transmission and receiving equipment. Moreover, the accuracy obtained with pulse-echo systems, while substantially greater than that obtained through the use of direction finding systems, is far from that desired.

From the standpoint of the accuracy of the position information obtained, one of the most promising systems thus far developed for survey work of the class under consideration is a hyperbolic, continuous wave system employing phase comparison in pairs of continuous wave signals radiated from at least three transmitting points to provide indications from which the position of the receiving point relative to the known positions of the transmitting points may be determined. In this particular system, the continuous waves radiated from each pair of transmitters produces standing waves in space, the phase relationship of which changes as a function of changing position between the two transmitting points. More specifically, the standing waves produced by any pair of transmitting units of the system are characterized by equi-phase lines which are hyperbolic in contour about the transmitting points as loci. On a line bisecting the pair of transmitters, these equi-phase lines are spaced apart a distance equal to one-half the mean wave length of the radiated waves. With this system arrangement, the position of a receiving point relative to a pair of hyperbolic equi-phase lines may be determined by measuring the phase relationship between the continuous waves transmitted from the pair of transmitters. Since the point of location of the receiving point along the zone separating the two equi-phase lines is not indicated by such a phase measurement, it becomes necessary to employ at least three spaced transmitters, different pairs of which function to provide a grid-like pattern of intersecting hyperbolic lines, thus permitting absolute determination of the position of the receiving point.

In a system of the above character, it is necessary, if accurate indications are to be obtained, to maintain phase synchronization between the continuous waves radiated by the spaced transmitters, or alternatively, so to arrange the system that phase shifts between the radiated waves are compensated during the phase comparing operation. Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of wave transmission required in survey work of the character under consideration. To obviate this problem, systems of the continuous wave hyperbolic type have been proposed (see Honore Patent No. 2,148,267) in which the phase shift problem is obviated by heterodyning the carrier waves of each pair of transmitters at a link transmitting point and modulating the difference frequency component of the heterodyned waves upon the carrier output of the link transmitter for radiation to the receiving point where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of equi-phase lines.

While the described arrangement for obviating the phase problem, as disclosed in Honore Patent No. 2,148,267, completely solves this problem, it entails the use of two carrier channels in addition to the three channels taken up by the three continuously operating survey transmitters, in order to make up a complete system. It is also desirable that the channel frequencies be located adjacent the broadcast band or at least below the ultra high frequency band in order to obviate the above-mentioned line-of-sight difficulty inherent in pulse-echo radar systems. This means location of the channel frequencies in the most crowded portion of the frequency spectrum, at least insofar as operations in the coastal waters of the United States are concerned. This particular problem has been in part solved by employing the continuous waves radiated by two of the survey transmitters in a three-transmitter system as carrier waves upon which the difference frequency signals as derived at the fixed link or reference stations are modulated, in the manner taught by Brunner Patent No. 2,417,807.

One difficulty with all such prior systems of the hyperbolic continuous wave type is the fact that they all operate at continuous wave frequencies well up in the radio frequency range, which, as pointed out above is required in order to get any effective radiation of the waves over the area in which position information is desired. The use of high frequency continuous wave propagation is desirable from the standpoint of the high degree of accuracy with which the position of the receiving point is determined relative to the transmitting points. Thus, a 360° phase change is obtained during movement of the receiving point between two adjacent hyperbolic equi-phase lines, and since in a high radio frequency system this spacing is a relatively small fraction of the distance from either transmitting point to the receiving point, exceedingly high accuracy is obtained in the distance indications. However, the system is ambiguous in the sense that the indications obtained do not identify the particular pair of equi-phase lines between which the receiving point is located. In other words, the same indications may be obtained at any one of a number of different observation points and hence it becomes necessary for the operator at the receiving point to know approximately the position of the receiving point in order to interpret the phase indications which are obtained from the receiving equipment.

It is an object of the present invention, therefore, to provide an improved radio position determining system of the continuous wave hyperbolic type which is free of wave phase synchronization difficulties of the character mentioned and in which the above-mentioned disadvantages pertaining to ambiguity are entirely obviated.

It is another object of the present invention to provide a radio position finding system of the character described in which non-ambiguous position indications are obtained.

According to a further object of the invention, ambiguity is eliminated by radiating from the survey transmitters carrier waves which are continuously modulated at lower frequencies and in which the modulation components of the radiated waves are utilized to provide position indications which are non-ambiguous, but are only approximately accurate, and the carrier components of the radiated waves are relied upon to produce position indications which are precisely accurate within the range of error of the indications derived from the modulations components of the waves.

It is still another object of the present invention to provide a system characterized by the feature of non-ambiguity and yet which is completely compensated against error resulting from variations in the phase relationship between the carrier or modulation components of the radiated waves.

The invention, both as to its organization and method of operation, together with further objects and advantages thereof, will best be understood by reference to the specification taken in connection with the accompanying drawings, in which:

Fig. 1 is a pictorial representation of a water covered area over which seismic survey operations are to be performed, illustrating the positional arrangement of the transmitting units embodied in the system and the grid system of hyperbolic equi-phase lines formed in space by the signals radiated from these transmitting units;

Fig. 2 diagrammatically illustrates the arrangement of the transmitting units embodied in the system shown in Fig. 1;

Fig. 3 diagrammatically illustrates the receiving, translating and recording equipment provided aboard the recording boat at which position indications are obtained;

Figs. 2A and 3A diagrammatically illustrate a modification of the system shown in Figs. 1, 2, and 3; and Figs. 4 and 5, when laid one above the other in the order named diagrammatically illustrate a further modification of the system shown in Figs. 1, 2, and 3.

Referring now to the drawings and more particularly to Figs. 1, 2, and 3 thereof, the present invention is there illustrated in its embodiment in a system for providing position information at the recording boats of seismic survey crews operating upon the Gulf of Mexico. Specifically the segment 9 of the illustrated shoreline bounds the southern shores of Texas and Louisiana. The dash line disposed below this shoreline segment represents the dividing line between waters having a depth less than one hundred fathoms and a depth more than one hundred fathoms, it being observed that with present-day techniques, oil well drilling operations are not particularly successful when undertaken in waters having depths much in excess of one hundred fathoms. Thus, for practical purposes, it may be assumed that the area within which position information is desired is that disposed between the one hundred fathom line and the shoreline segment 9.

In brief, the illustrated system comprises three transmitting units 10, 11, and 12 which are spaced apart approximately equal distances along the shoreline 9 and are so positioned that the line bisecting the units 10 and 11 is angularly related to the line bisecting the units 11 and 12. As specifically described below, these transmitting units are equipped continuously to radiate amplitude modulated carrier waves having carrier components of different frequencies and modulation components of different frequencies such that standing waves are produced in space to blanket the area under survey. Four sets of hyperbolic equi-phase lines between the standing waves are thus produced. More specifically, the continuously radiated carrier wave components of the waves produce standing waves in space which provide two sets of hyperbolic equi-phase lines each of which is representative of the loci of positions of constant phase difference between the carrier components of the radiated waves. Thus, the survey transmitters of the units 10 and 11 cooperate to produce standing carrier waves having hyperbolic equi-phase lines 15. Similarly, the survey transmitters of the units 11 and 12 cooperate to provide a carrier standing wave pattern comprised of hyperbolic equi-phase lines 16. All of the equi-phase lines have not been illustrated in Fig. 1 of the drawings, but enough have been shown to demonstrate the fact that a grid of hyperbolic equi-phase lines is laid down to blanket the area under survey by the two pairs of transmitting units 10, 11 and 11, 12. In an entirely similar manner the modulation components of the waves radiated by the pair of transmitters 10 and 11 produce standing waves having hyperbolic equi-phase lines therebetween which intersect the corresponding lines resulting from the modulation components of the waves radiated by the second pair of transmitters 11 and 12.

The system further comprises translating and receiving equipment 13 aboard each recording boat 14 operating in the area under survey. In this connection, it may be pointed out that in seismic survey work over water, it is conventional practice to equip each survey crew with a recording boat on which all recording operations are performed. It may further be pointed out that any number of recording boats equipped with receiving and translating equipment 13 of the character shown in Fig. 3 of the drawings may utilize the signals originating at the transmitting units 10, 11, and 12 to obtain the desired position information.

As best shown in Fig. 2 of the drawings, each of the transmitting units 10, 11, and 12 is comprised of a survey transmitter for radiating a modulated carrier wave. The translating units 10 and 12 are additionally equipped with link transmitters and with receiving means arranged for carrier and modulation component heterodyning in the manner more fully explained below. Specifically, the survey transmitter embodied in the unit 10 comprises a carrier wave generator or oscillator 10a, a modulation wave generator or oscillator 10b and a modulator and power amplifier unit 10c in which the output from the oscillator 10b is amplitude modulated upon the output of the carrier wave oscillator 10a and amplified for radiation by the antenna-ground circuit 10d. Similarly, the survey transmitter embodied in the transmitting unit 11 comprises a carrier wave oscillator or generator 11a, a modulation wave generator or oscillator 11c and modulator and power amplifier unit 11b in which the modulation wave output of the generator 11c is amplitude modulated upon the carrier wave output of the generator 11a and then amplified for radiation by the antenna-ground circuit 11d. The survey transmitter embodied in the transmitting unit 12 is identical with the survey transmitters just described, with the exception that the output frequencies of the carrier and modulation wave generators thereof are different from the output frequencies of the corresponding generators embodied in the survey transmitter of the units 10 and 11.

As indicated above, the carrier frequencies at which the survey transmitters of the three transmitting units 10, 11, and 12 operate are sufficiently different to permit separation thereof on a frequency selective basis. Preferably, however, the frequency separation between the survey transmitter carriers is small enough to be embraced within not more than two adjacent channel allocations of ten kilocycles specified by the Federal Communications Commission. To this end, the output frequencies of the carrier wave generators 10a, 11a, and 12a embodied in the survey transmitters of the units 10, 11, and 12 may be 1800 kilocycles, 1804 kilocycles and 1809 kilocycles, respectively, such that four and five kilocycle spacings are provided between the output carrier frequencies of the survey transmitters in the transmitting unit pairs 10, 11, and 11, 12. The output frequencies of the modulation wave generators embodied in the three units 10, 11, and 12 are also different. For example, the generator 11c may be designed to operate at a fixed frequency of one kilocycle, whereas the corresponding generators of the units 10 and 12 may be designed to operate at 1.75 and 2.9 kilocycles, respectively. Employing the frequencies specifically specified, the survey transmitter of the unit 10 functions to radiate a carrier wave of 1800 kilocycles amplitude modulated at a frequency of 1.75 kilocycle; the survey transmitter of the unit 11 functions to radiate a carrier of 1804 kilocycles amplitude modulated at 1.0 kilocycle; and the survey transmitter of the unit 12 operates to radiate a carrier wave of 1809 kilocycles amplitude modulated at a modulation frequency of 2.9 kilocycles. The power of the survey transmitters is such that the entire area to be surveyed is blanketed with the radiated waves and that these waves have a field strength at any and all points within this area sufficient to permit reliable reception without requiring undue sensitivity of the receiving equipment.

In order to obviate the above-mentioned difficulties attendant with phase synchronization of the carrier and modulation components of the signals radiated from the three survey transmitters, facilities are provided in the transmitting units 10 and 12 for transmitting continuously from these two transmitting units reference signals representative of the carrier and modulation component difference frequencies, so that they may be received at any receiving point such, for example, as aboard the recording boat 14 located within the area under survey. The equipment for this purpose as provided at each of the transmitting units 10 and 12 is identical and hence only that embodied in the unit 10 has been illustrated in the drawings. In brief, this equipment comprises a fixed tuned receiver 18 which is sharply selective to the 1800 and 1804 kilocycle carriers respectively radiated by the survey transmitters of the units 10 and 11. Preferably, the selectivity of this receiver is such that the 1809 kilocycle carrier originating at the transmitting unit 12 is rejected in the radio frequency section thereof. The beat frequency of four kilocycles between the two carriers accepted by the radio frequency sections of the receiver 18 is passed on a selective basis by a sharply tuned four kilocycle band pass filter 19 and delivered to the modulator stage of a link transmitter 17 for amplitude modulation upon the carrier output of this transmitter and radiation by the antenna-ground circuit 17d. Thus, the receiver 18 and the band pass filter 19 cooperate with the link transmitter 17 in their response to the carrier components of the waves radiated by survey transmitters of the units 10 and 11, to transmit a signal which is truly representative of (equal to) the beat frequency between the carrier components of the waves radiated by the survey transmitters of the units 10 and 11. Apparatus is also provided for amplitude modulating the carrier output of the link transmitter 17 with a signal which is truly representative of the difference frequency between the modulation components of the waves radiated by the survey transmitters of the units 10 and 11. This apparatus comprises a receiving channel which includes an 1800 kilocycle wave trap 20 and a fixed tuned 1804 kilocycle receiver 21 connected in tandem in the order named for receiving and detecting the one kilocycle modulation component of the wave radiated from the survey transmitter of the unit 11; an 1804 kilocycle wave trap 22 and a fixed tuned 1800 kilocycle receiver 23 connected in tandem in the order named for receiving and detecting the 1.75 kilocycle modulation component of the wave radiated by the survey transmitter of the unit 10; a mixer 24 for heterodyning the detected 1.0 and 1.75 kilocycle modulation components; and a sharply tuned 0.75 kilocycle band pass filter 25 for passing the 0.75 kilocycle difference frequency to the modulator stage of the transmitter 17 for amplitude modulation upon the carrier output of the transmitter 17. This link transmitter is designed to operate at a carrier frequency, such, for example, as 1825 kilocycles, which is distinguishable from the carrier frequencies of the three survey transmitters.

As indicated above, the receiving and link transmitting equipment provided in the transmitting unit 12 is entirely similar to that provided at the transmitting unit 10 and described above. It is noted, however, that the carrier wave receiver forming a part of this equipment as provided in the unit 12 is designed to accept only the 1804 kilocycle and 1809 kilocycle carriers radiated by the survey transmitter of the units 11 and 12 and to reject the 1800 kilocycle carrier radiated by the survey transmitter of the unit 10. Further, the modulation wave receiving and detecting equipment as provided at the transmitting unit 12 is designed to receive, detect, mix, and select the difference frequency between the modulation components of the waves radiated by the survey transmitting units 11 and 12. The two detected difference frequency signals of 1.9 and 5 kilocycles are amplitude modulated upon the carrier output of the link transmitter in the unit 12 which may be designed to operate at the distinguishable carrier frequency of 1775 kilocycles.

From the foregoing explanation, it will be understood that five distinct and distinguishable amplitude modulated carrier waves are radiated from the three transmitting units 10, 11, and 12. Specifically, the survey transmitter embodied in the transmitting unit 10 radiates a carrier wave of 1800 kilocycles modulated at a frequency of 1.75 kilocycles, the survey transmitter embodied in the transmitting unit 11 radiates a carrier wave of 1804 kilocycles modulated at a frequency of 1.0 kilocycle, and the survey transmitter incorporated in the transmitting unit 12 radiates a carrier wave of 1809 kilocycles modulated at a frequency of 2.9 kilocycles. The carrier and modulation wave components of these three continuously radiated signals are adapted to be heterodyned by the receiving and translating equipment provided aboard any recording boat 14 within the radius of transmission of the three transmitting units. In addition to these three signals, two reference signals are also continuously radiated by the link transmitters embodied in the two transmitting units 10 and 12. Thus the link transmitter 17 forming a part of the transmitting unit 10 continuously radiates a carrier wave of 1825 kilocycles which is amplitude modulated at a frequency of 4 kilocycles representative of the difference frequency between the carrier wave frequencies of the survey transmitters embodied in the units 10 and 11 and also modulated at a frequency of 0.75 kilocycle which is representative of the difference frequency between the modulation components of the waves continuously radiated by the survey transmitters of the two units 10 and 11. In similar manner, the link transmitter embodied in the transmitting unit 12 radiates a carrier wave of 1775 kilocycles which is modulated at a frequency of 5 kilocycles representative of the difference frequency between the carrier waves radiated by the survey transmitters of the two units 11 and 12, and also modulated at a frequency of 1.9 kilocycles representative of the difference frequency between the modulation components of the waves transmitted by the survey transmitters of the two units 11 and 12. These five signals, as radiated from the three units 10, 11, and 12, are received and translated by the equipment illustrated in Fig. 3 of the drawings to provide indications from which the geographical position of the receiving equipment may be precisely ascertained, all in the manner more fully explained below.

To describe now more particularly the equipment provided aboard each recording boat 14 for deriving position information from the described signals radiated by the three transmitting units 10, 11, and 12, as well as for recording this information concurrently with the recording of seismic waves, reference is made to Fig. 3 of the drawings wherein this equipment is diagrammatically illustrated. In general, this equipment comprises two receiving units 13A and 13B of identical arrangement, a conventional oscillographic recorder 40 which may be of any desired commercial construction and preferably is of the twenty-four trace variety, a plurality of seismic wave amplifying channels, two of which are indicated at 52 and 53, for separately impressing seismic waves detected by a pair of geophones 50 and 51 upon the galvanometer coils 43 and 47 of different recording elements embodied in the recorder 40, and four phase angle meters 32, 38, 32a and 38a. As shown, the two phase meters 32 and 38 are associated solely with the receiving unit 13A, whereas the two phase meters 32a and 38a are associated solely with the receiving unit 13B. Preferably, these meters are of the general character disclosed in Patent No. 1,762,725—Marrison, granted June 10, 1930, and are capable of measuring phase angles in excess of 360 electrical degrees between two impressed signal voltages. Each phase meter is equipped with a rotatable rotor carrying a pointer which indexes with a circular scale to indicate the phase relationship between the two impressed voltages. For the purpose of recording the indications provided by these phase meters during operation of the equipment, the rotor element of each meter is gear-connected to actuate the movable contact of a potentiometer incorporated in the energizing circuit for one of the galvanometer coils of the recorder 40. Thus, the rotor element of the phase meter 38 is gear connected to change the setting of the potentiometer 41 in direct proportion to changes in the phase angle measured by this meter. This potentiometer is connected to be adjustably included in the energizing circuit of the galvanometer coil 41a of the recorder 40 in series with an energizing battery 41b. Similarly, the rotor elements of the meters 32, 32a and 38a are arranged to control the settings of potentiometers 42, 49, and 48 respectively, which are connected in series with batteries 42b, 49b and 48b, respectively in the circuits for energizing the galvanometer coils 42a, 49a, and 48a of the recorder 40.

Referring now more particularly to the component arrangement of the receiving unit 13A, it will be noted that this unit comprises four separate and distinct signal translating channels. The first of these channels comprises an 1804 kilocycle wave trap 26 and a fixed tuned 1800 kilocycle receiver 27 which is designed to detect and deliver to a mixer stage 28 the 1.75 kilocycle modulation component of the wave radiated from the survey transmitter of the transmitting unit 10. The purpose of providing the 1804 kilocycle wave trap ahead of the receiver 27 is to prevent this receiver from responding to the modulated carrier wave radiated by the survey transmitter of the transmitting unit 11. Thus the receiver 27 delivers at its output terminals only the detected 1.75 kilocycle modulation components of the signal radiated by the survey transmitter of the transmitting unit 10. This signal must be heterodyned with the modulation component of the signal radiated from the survey transmitter of the unit 11 to provide a difference frequency signal which may be phase compared with the modulation frequency reference signal of 1.75 kilocycles transmitted by the link transmitter of the unit 10 in order to obtain one of the phase indications from which the desired position information is obtained. To this end, the second signal channel is comprised of an 1800 kilocycle wave trap 29 and a fixed tuned 1804 kilocycle receiver 30 for detecting the 1.0 kilocycle modulation component of the signal radiated by the survey transmitter of the transmitting unit 11. Here, again, the purpose of providing the wave trap 29 is to exclude the signal radiated from the survey transmitter of the unit 10 from the radio frequency section of the receiver 30. The detected 1.0 kilocycle signal thus produced at the output terminals of the receiver 30 is delivered to the second set of input terminals of the mixer 28. The difference frequency signal of 0.75 kilocycle between the 1.75 and 1.0 kilocycle signals impressed upon the mixer 28 is obtained by connecting the output terminals of this mixer to a filter 31 having a pass character sharply peaked at a center frequency of 0.75 kilocycle and having its output terminals connected to the upper set of input terminals of the phase meter 32.

The third of the four signal translating channels provided in the receiving unit 13A performs the function of heterodyning the carrier wave components of the signals radiated by the survey transmitters of the two transmitting units 10 and 11. To this end, a receiver 37 is provided in this channel which is fixed tuned to only carrier waves of 1800 and 1804 kilocycles and is relatively insensitive to frequencies outside of the narrow band specified. With such an arrangement, the carrier wave components of the signals radiated from the survey transmitters in the two units 10 and 11 are heterodyned in the radio frequency section of the receiver 37 and the difference frequency of four kilocycles is detected and passed through the audio section of the receiver to the output terminals thereof, along with the detected modulation components of the two received signals. This difference frequency signal is, in turn, passed through a filter 36 which is sharply tuned to pass only 4 kilocycle signals and hence rejects the 1 and 1.75 modulation components of the two received signals. Finally, the 4 kilocycle difference frequency signal as delivered at the output side of the unit 36 is impressed on the upper set of input terminals of the phase meter 38.

The fourth signal translating channel provided in the receiving unit 13A is for the purpose of receiving and detecting the reference signals riding as modulation components upon the carrier radiated from the link transmitter of the transmitting unit 10. Specifically, this channel comprises a fixed tuned 1825 kilocycle receiver 33 capable of receiving, detecting and delivering to its output terminals the 0.75 and 4 kilocycle modulation components of the signal radiated by the link transmitter 17. The output signal of the receiver 33 is delivered to the parallel connected input terminals of two narrow band pass filters 35 and 34 which are tuned to center frequencies of 0.75 and 4 kilocycles respectively. Thus, the 4 kilocycle component of the signal appearing at the output side of the receiver 33 is rejected by the filter 35 and passed by the filter 34 to be applied to the lower set of the input terminals of the phase meter 38 for phase comparison with the 4 kilocycle difference frequency signal delivered to the upper set of input terminals of this phase meter from the receiver 37 and the filter 36. Similarly, the 0.75 kilocycle component of the signal appearing at the output side of the receiver 33 is rejected by the filter 34 and passed by the filter 35 to be applied to the lower set of input terminals of the phase meter 32 for phase comparison with the difference frequency signal of 0.75 kilocycle between the modulation components of the signals radiated by the survey transmitter of the units 10 and 11. Thus, it will be understood that the phase meter 32 functions to produce an indication of the phase relationship between a signal representative of the difference frequency between the modulation components of the signals radiated by the survey transmitters 10 and 11 and a reference signal obtained by heterodyning these modulation components at or in proximity to the transmitting unit 10 and by transmitting the same to the receiving point by way of the carrier radiated by the link transmitter 17. It will also be understood that the phase meter 38 functions to indicate the phase angle between a signal representative of the difference frequency between the carrier components of the waves radiated by the survey transmitters of the units 10 and 11 and a reference signal of the same frequency obtained by heterodyning these carrier components at or in proximity to the transmitting unit 10 and by transmitting the heterodyned signal as a modulation component on the carrier radiated by the link transmitter 17. Since the receiving unit 13B is identical with the receiving unit 13A just described, except for the signal frequency acceptance characteristics of the receivers embodied therein, it will be understood that the phase meter 32a is assigned the modulation component phase comparison function, whereas the phase meter 38a is assigned the carrier component phase comparison function. In this regard, it may be pointed out that the four signal transmission channels of the receiving unit 13B are designed to respond only to the three signals radiated from the two survey and one link transmitter of the transmitting units 11 and 12. Thus, the receiving unit 13A is designed to respond to the three signals originating in the pair of transmitting units 10 and 11 and the receiving unit 13B is designed to respond to the three signals originating at the pair of transmitting units 11 and 12.

In considering the operation of the above described system, it will be understood that at any location of the recording boat 14 within the radius of transmission of each of the three transmitting units 10, 11, and 12, the receiving unit 13A is arranged to measure the phase angle between the standing waves produced in space by the transmitters 10 and 11, both as regards the modulation and carrier components of the radiated waves, and the receiving unit 13B performs the same function in its response to the waves radiated by the transmitting units 11 and 12. More specifically, the modulated carrier wave radiated from the survey transmitter of the transmitting unit 10 is passed by the wave trap 26, selected, amplified and demodulated in the receiver 27, with the result that the 1.75 kilocycle modulation component thereof is delivered to the left set of input terminals of the mixer 28. Similarly, the modulated carrier wave radiated by the survey transmitter of the transmitting unit 11 is passed by the wave trap 29, selected, amplified and demodulated in the receiver 30, with the result that the 1.0 kilocycle modulation component thereof is delivered to the right set of input terminals of the mixer 28. This mixer operates in an entirely conventional manner to produce sum and difference frequency signals across its output terminals when energized by the 1.75 and 1.0 kilocycle input signals. However, only the difference frequency signal of 0.75 kilocycle as developed across the output terminals of the mixer 28 is passed by the 0.75 kilocycle filter 31 to be applied to the upper set of input terminals of the phase meter 32. The phase meter 32 functions to determine the phase relationship between 0.75 kilocycle signal thus obtained and the 0.75 kilocycle signal which is obtained by heterodyning at the transmitting unit 10 the modulation components of the waves radiated by the survey transmitters of the units 10 and 11. Thus, the 0.75 kilocycle modulation component of the 1825 kilocycle carrier radiated by the link transmitter 17 of the unit 10 is detected in the receiver 33 and passed by the filter 35 for application to the lower set of input terminals of the phase meter 32 in the exact manner explained above. When thus energized by two input signals which may have a phase displacement ranging from zero to 360°, the rotor element of the phase meter 32 assumes a setting precisely representative of the phase angle between the two signal voltages and, hence, provides an indication of the position of the receiving point, namely, the recording boat 14, relative to an equi-phase line between the standing waves of the modulation components respectively radiated by the survey transmitters of the two transmitting units 10 and 11. With the described arrangement, wherein signal frequencies of 1.0 and 1.75 kilocycles are heterodyned, the wave length spacing of the equi-phase lines is determined by the mean frequency of 1.375 kilocycles between the two modulation frequencies. At this particular mean frequency, equi-phase lines representative of the same phase relationship between the standing waves are spaced a distance of about 68 miles apart. Hence, the distance indication provided by the phase meter 32 identifies the position of the recording boat 14 within a zone not less than 68 miles in width, i. e., a zone having a minimum width equal to one-half the wave length of a wave having a frequency equal to the mean frequency of the modulation components of the waves radiated by the survey transmitters of the two units 10 and 11. Specifically, the indication provided by the meter 32 shows the position of the recording boat in terms of the distance of this boat from one equi-phase line, in most cases the first line removed from the transmitting unit 10. Due to the wide spacing between the equi-phase lines, it is, of course, easy for the equipment operator to determine which of these lines the particular indication provided by the meter 32 is related to.

In a similar manner, the phase meter 32a responds to the difference frequency signals derived from the heterodyning of the modulation components of the waves radiated by the transmitting units 11 and 12 to provide an indication representative of the distance of the recording boat 14 from the transmitting unit 12, for example. This indication is likewise based upon a half wave length spacing of the equi-phase lines, which spacing has a large order of magnitude. The two indications thus provided by the phase meters 32 and 32a may be resolved into distance indications from which the position of the boat relative to the two transmitting units 10 and 12 may readily be determined. Due to the relatively wide range of distances over which the phase meters 32 and 32a are required to provide indications, the accuracy afforded by these indications is not within the limits prescribed by survey work of the character under consideration. It is for this reason that the short wave length carrier components of the waves radiated by the survey transmitters of the three transmitting units 10, 11, and 12 are relied upon to provide distance indications which are accurate within a matter of a foot or less at ranges of 50 miles or more.

Specifically, the carrier components of the waves radiated by the survey transmitters of the units 10 and 11 are intercepted by the antenna ground circuit of the receiver 37 and are heterodyned in the radio frequency stages of this receiver to develop a four kilocycle beat frequency signal which is detected at the second detector stage of the receiver and passed through the audio channel thereof to appear across the output terminals of the receiver. The modulation components of 1.0 and 1.75 kilocycles riding on the two carriers radiated from the survey transmitters of the units 10 and 11 may also be detected and passed to the output terminals of this receiver. These signals are, however, rejected by the filter 36, whereas the 4 kilocycle beat frequency signal is passed by this filter and impressed upon the upper set of input terminals of the phase meter 38. This phase meter functions to measure the phase angle between the described 4 kilocycle beat frequency signal and the 4 kilocycle beat frequency signal which is obtained by heterodyning the carrier components of the waves radiated by the survey transmitters of the units 10 and 11 at the transmitting unit 10. Thus, the 4 kilocycle modulation component of the wave radiated by the link transmitter 17 is detected by the receiver 33 and passed by the filter 34 to be applied to the lower set of input terminals of the phase meter 38. Here, again, the phase angle between the two applied signal voltages as measured by the meter 38 may have a value ranging from 0 to 360°, depending upon the position of the recording boat relative to the transmitting units 10 and 11. The particular phase angle indicated by the setting of the rotor element embodied in the meter 38 accurately locates the position of the recording boat 14 relative to one of the equi-phase lines 15 pictured in Fig. 1 of the drawings. In this case, the spacing between the equi-phase lines is also determined by the mean frequency of the carrier frequencies employed at the survey transmitters of the units 10 and 11; specifically, at a frequency of 1802 kilocycles. At this frequency, the spacing between equi-phase lines representative of the same phase angle between the carrier components of the waves radiated by the survey transmitters of the units 10 and 11 ranges upward from approximately 273 feet. It will be apparent, therefore, that the total indicating range represented by one complete revolution of the rotor element embodied in the phase meter 38 covers a distance of the order of 273 feet and hence that the accuracy of this indication is extremely high. On the other hand, while the accuracy of indication provided by this meter is excellent and far superior to that provided by the phase meter 32, the limited range of distance over which the meter 38 operates makes it imperative that the approximate position of the boat 14 be known, due to the relatively large number of zones within which the same indication is provided by this meter. Thus, it is quite difficult and practically impossible to maintain a log on the position of the boat 14 with sufficient continuity to know at all times the particular 273 foot zone within which the boat is located. Thus, the importance of obtaining the position of the boat with approximate accuracy through operation of the phase meters 32 and 32a becomes manifest. In this regard, it is noted that the accuracy of indication of the two meters 32 and 32a is well within that required to definitely locate the 273 foot zone to which the indications provided by the phase meters 38 and 38a relate. To summarize, the phase meters 32 and 32a provide distance indications which locate with approximate accuracy the position of the boat 14 relative to the known positions of the three transmitting units 10, 11, and 12, and the phase meters 38 and 38a provide distance indications which locate the position of the boat 14 relative to the known positions of the same transmitting units with precision accuracy.

As described above, the rotatable indicating elements of the four phase meters are respectively geared to the movable contacts of the potentiometers 41, 42, 48 and 49. Hence, as the settings of the phase meter indicating elements are changed, the magnitudes of current flow through the associated ones of the galvanometer coils 41a, 42a, 48a and 49a are correspondingly changed to produce corresponding changes in the settings of the galvanometer mirrors respectively associated with these coils. Thus, the system is so arranged that the four distance indications may be recorded by the recorder 40 concurrently with recording of the seismic signals developed during a seismic shooting operation.

The manner in which the seismic wave detectors 50—51 are arranged in a predetermined array relative to a shot point and function to convert into electrical signals the reflected and refracted seismic rays resulting from detonation of an explosive charge at the shot point will be readily understood by those skilled in the art of seismic surveying. In the usual case, the explosive charge is detonated beneath the surface of the body of water over which these survey operations are being conducted, at a known position displaced a predetermined distance from the detector array, and the detectors are likewise displaced from each other a predetermined distance and arranged in a definite array, such, for example, as in line with the shot point. The described position finding system may be employed for the purpose of definitely locating the position of the shot point and the position of each detector in the detector array, all in a manner which will be fully apparent from the foregoing explanation.

Further, as the shot point and the detector placement points are successively located, the recorder may be successively operated to produce a series of record indications on the record strip 40a which definitely locate geographically each of the several points. In this regard it will be understood that during each operation of the recorder 40, each recording element produces a separate and distinct trace on the record strip 40a, and that the position of the trace transversely of the strip follows variations in the energization of the galvanometer coil embodied in the recording element. Thus, as the galvanometer coil 41a is variably energized during a recording operation, a trace 41d is produced on the record strip which follows variations in the energization of the coil 41a. Since, however, at any given location of the recording boat, the coil 41a is constantly energized by current, the magnitude of which is related to the setting of the rotor element embodied in the phase meter 38, a straight line trace 41d will be produced on the record strip 40a during the recording operation. The distance between this trace and a reference line 41c representative of zero energization of the coil 41a is accurately indicative of the setting of the rotor embodied in the phase meter 38 and hence of the distance indication provided by this element.

In a similar manner, the phase meters 32, 38a and 32a cause straight line traces 42d, 48d and 49d to be produced on the record strip 40a during each recording operation which are respectively spaced from their associated reference lines 42c, 48c and 49c by distances accurately indicative of the indications provided by the three meters 32, 38a and 32a. Thus, by operating the recorder 40 for a very short interval as each shot and detector placement point is located, a pictorial record is produced on the record strip 40a which may readily be interpreted to provide all of the necessary position information regarding the set-up prior to a shooting operation.

After the explosive charge is located at the shot point and the detectors 50—51 are located in the proper positions relative to the shot point, the explosive charge may be detonated in the usual manner to propagate seismic waves through the subsurface structure of the earth which are reflected and refracted from strata interfaces and the like to be detected by the detectors 50—51. The detected waves are converted into corresponding electrical signals by the detectors 50—51 in the usual manner and these signals are amplified by the amplifiers 52—53 and impressed upon the galvanometer coils 43—47 of the recorder 40.

This recorder is operated continuously during the shooting operation so that record traces 43d—47d are produced on the record strip 40a which pictorially depict the detected seismic waves. Concurrently with recording of the seismic wave trains picked up by the detectors 50—51, the traces, 41d, 42d, 48d and 49d are again produced on the record strip to identify the location of the recording boat during the shooting operation. After the record is thus completed, it may be severed from the record strip supply roll, developed, and interpreted, with all of the necessary information regarding the geographic locations of the shot and detector points being portrayed on the same record on which the seismic information is recorded.

Referring now more particularly to Figs. 2A and 3A of the drawings, there is illustrated a modification of the system shown in Figs. 1, 2, and 3 and more particularly a system arrangement whereby the link transmitters of the transmitting units 10 and 12 may be eliminated to reduce the number of channels required in operating the system. In Figs. 2A and 3A, components corresponding to like components of the system shown in Figs. 2 and 3 have been identified by the same reference numerals distinguished only by the addition of the subscript "a." Generally speaking, elimination of the link transmitters from the transmitting units 10 and 12 is made possible by utilizing phase modulation of the carriers radiated by the survey transmitters of these units to transmit the difference frequency reference signals to receiving points within the area under survey. Thus, the 0.75 kilocycle difference frequency signal between the modulation components of the waves radiated by the survey transmitters of the two units 10 and 11 is developed in the exact manner explained above with reference to Figs. 1 and 2 of the drawings through operation of the system components 20a, 21a, 22a, 23a, and 24a. This signal is passed by the band pass filter 25a to a phase modulator 56 having the function of phase modulating the signal upon the carrier output of the transmitter 10f. Similarly, the four kilocycle difference frequency signal between the carrier components of the waves radiated by the survey transmitters of the units 10 and 11 is detected and amplified by the amplitude modulation receiver 18a selectively passed by the 4 kilocycle filter 19a and delivered to a phase modulator 55 having the function of phase modulating this signal upon the carrier wave output of the transmitter 10f. Thus, the survey transmitter 10f of the transmitting unit 10 radiates a wave having an 1800 kilocycle carrier component, a 1.75 kilocycle amplitude modulation component, a 0.75 kilocycle phase modulation component representative of the difference frequency signal between the modulation components of the waves radiated by the survey transmitters of the two units 10 and 11, and a 4 kilocycle phase modulation component representative of the difference frequency signal between the carrier components of the waves radiated by the survey transmitters of the two units 10 and 11.

In an entirely similar manner, the transmitting equipment embodied in the transmitting unit 12 is modified so that the difference frequency signals between the modulation and carrier components of the waves radiated by the survey transmitters of the units 11 and 12 are phase modulated upon the carrier radiated by the survey transmitter of the unit 12. Specifically, the survey transmitter of the unit 12 radiates a wave which is comprised of an 1809 kilocycle carrier component, a 2.9 kilocycle amplitude modulation component, a 5 kilocycle phase modulation component representative of the difference frequency between the carrier components of the waves radiated by the survey transmitters of the units 11 and 12, and a 1.9 kilocycle phase modulation component representative of the difference frequency signal between the amplitude modulation components of the waves radiated by the survey transmitters of the units 11 and 12.

When the transmitting equipment is modified in the manner illustrated in Fig. 2A of the drawings and described above, it becomes necessary to modify the receiving equipment aboard each recording boat to the extent of substituting phase modulation receivers fixed tuned respectively to the carrier frequencies of the survey transmitters in the units 10 and 12 for the receivers included in the equipment boat in Fig. 3 of the drawings to receive and detect the reference signals radiated by the link transmitters of the two units 10 and 12. Thus, a phase modulation receiver 33a, fixed tuned to the 1800 kilocycle carrier output frequency of the survey transmitter embodied in the unit 10 and having a pass characteristic in excess of 4 kilocycles, is substituted for the amplitude modulation receiver 33 in the receiving unit 13A of the equipment shown in Fig. 3 of the drawings. Otherwise, the receiving unit 13A as shown in Fig. 3A is identical with the corresponding unit as shown in Fig. 3.

Aside from the manner in which the difference frequency reference signals are relayed from the transmitting units 10 and 11 to the receiving equipment aboard a recording boat, the modified system as shown in Figs. 2A and 3A of the drawings operates in exactly the same manner as the system illustrated in Figs. 1, 2, and 3 of the drawings and described above. In this regard, it will be understood that the phase modulation receiver 33a performs the function of extracting the phase modulation components from the wave radiated by the survey transmitter of the transmitting unit 10. This receiver is designed to respond only to phase modulation of a received carrier and to be completely insensitive to amplitude modulation components of the received carrier. Hence, the 1.75 kilocycle amplitude modulation component of the received wave produces no measurable response at the output terminals of the receiver 33a. Further, the heterodyning of the 1800 and 1804 kilocycle carrier components of the waves radiated from the survey transmitters of the units 10 and 11, which occurs in the radio frequency section of the receiver 33a, may effectively be regarded as an amplitude modulation component of the received 1800 kilocycle carrier. Accordingly, the heterodyning action produces no measurable signal at the output side of the receiver 33a. Thus, this receiver passes on to the parallel connected filters 34a and 35a only the detected phase modulation components of the received wave, namely, the difference frequency signals between the modulation and carrier components of the waves radiated by the survey transmitters of the units 10 and 11. It will be further understood that the three amplitude modulation receivers embodied in the receiving unit 13A are completely insensitive to the phase modulation components of the wave radiated by the survey transmitter of the transmitting unit 10. Thus, the receiver 27a, which is fixed tuned to receive the wave radiated from the survey transmitter of the unit 10, is only capable of demodulating and amplifying amplitude modulation components of the received signal. Accordingly, this receiver rejects the 0.75 and 4 kilocycle phase modulation components of the received wave. As indicated above, aside from the described method of relaying the different frequency reference signals to the receiving equipment, the system as partially shown in Figs. 2A and 3A of the drawings and just described, is identical with that of Figs. 2 and 3 of the drawings and functions in precisely the manner described above.

Referring now more particularly to Figs. 4 and 5 of the drawings, there are illustrated two transmitting units 10A and 11A and one receiving unit 13C of a modified system in which the approximate and precision position indications are obtained without heterodyning the carrier components of the radiated waves. This modified system retains the very desirable feature of eliminating the link transmitters at two of the three receiving units, and is arranged to operate at carrier frequencies located at the threshold of the line-of-sight high frequency region of the frequency spectrum where considerably more channel space is available at the present time. Since the third transmitting unit and the second receiving unit (which are required to form a complete position finding system) are in all physical respects identical with the units 10A and 13C, respectively, they have not been illustrated in the drawings in the interests of simplifying the disclosure.

In brief, the equipment forming the transmitting unit 10A comprises a combined link and survey transmitter 60 having a 155 megacycle carrier current generator, the output of which is amplitude modulated at a frequency of 20.2 kilocycles by a modulation wave generator 61. The carrier component of the wave radiated by the transmitter 60 is also phase modulated at two different frequencies in the manner more fully pointed out below. The transmitting unit 11A similarly comprises a survey transmitter 72 embodying a carrier wave generator operating at a frequency of 150 megacycles and the output of which is amplitude modulated at a frequency of 20 kilocycles by a modulation wave generator 73.

At the transmitting unit 10A, the amplitude modulated carrier waves respectively radiated by the two transmitters 60 and 72 are respectively received by two fixed tuned amplitude modulation receivers 62 and 63. After detection and amplification in the receivers 62 and 63, the 20 and 20.2 kilocycle modulation components of the two received waves are applied to the two sets of input terminals of a mixer 64, wherein the sum and difference frequencies are developed in the usual manner. The difference frequency of 0.2 kilocycle developed at the output terminals of the mixer 64 is selectively passed by a band pass filter 65 sharply tuned to this difference frequency and delivered to a phase modulator 66 having the function of phase modulating this difference frequency signal upon the carrier output of the transmitter 60. The modulation components of the waves received by the two receivers 62 and 63, as detected and passed to the output sides of these receivers, are frequency multiplied through frequency multipliers 67 and 68, which are designed to multiply the input signal frequencies by a factor of 100 and are applied to the two sets of input terminals of a second mixer 69. Thus, after multiplication through the frequency multipliers 67 and 68, the signals impressed upon the input terminals of the mixer 69 are characterized by frequencies of 2000 kilocycles and 2020 kilocycles, respectively. This mixer, in its operation to heterodyne the two input signals, develops the difference frequency of 20 kilocycles which is selectively passed by the band pass filter 70 to the exclusion of the other sum and difference frequencies developed in the mixer 69 and delivered to a phase modulator 71 having the function of phase modulating this signal upon the carrier wave output of the transmitter 60.

From the preceding explanation, it will be understood that with the equipment embodied in the two transmitting units 10A and 11A in continuous operation, the survey transmitter of the unit 11A radiates a wave having a carrier component of 150 megacycles amplitude modulated with a modulation component of 20 kilocycles. The wave radiated from the transmitting unit 10A, on the other hand, is comprised of a 155 megacycle carrier component, a 20.2 kilocycle amplitude modulation component, a 20 kilocycle phase modulation component, and an 0.2 kilocycle phase modulation component. In this regard, it is noted that the two fixed tuned amplitude modulation receivers 62 and 63 are incapable of detecting phase modulation components of received carrier waves. Accordingly, the 20 and 0.2 kilocycle phase modulation components of the wave radiated by the transmitter 60 are not reproduced at the output sides of the two receivers 62 and 63.

The receiving unit 13C comprises two amplitude modulation receivers 74 and 75 fixed tuned to the 155 and 150 megacycle carrier frequencies at which the transmitters 71 and 72 are operating, for detecting and reproducing the 20.2 and 20 kilocycle amplitude modulation components of the waves respectively radiated by these two transmitters, and a fixed tuned 155 megacycle phase modulation receiver 80 for detecting and reproducing the phase modulation components only of the wave radiated by the transmitter 60. The 0.2 and 20 kilocycle signals thus developed across the output terminals of the receiver 80 are respectively passed by two sharply tuned band pass filters 81 and 82 to be applied to the fixed contacts 87 and 88 of a four pole-double throw switch 86. The 20.2 and 20 kilocycle signals respectively developed across the output terminals of the receivers 74 and 75 are applied to opposite sets of input terminals of a mixer 76 with the result that a 0.2 kilocycle difference frequency signal is developed across the output terminals of this mixer. This difference frequency signal is selectively passed by a sharply tuned band pass filter 84 and is impressed across the pair of fixed contacts 90 of the switch 86. The 20.2 and 20 kilocycle signals developed at the output sides of the receivers 74 and 75 are also impressed respectively upon the input terminals of two frequency multipliers 77 and 78, each of which is designed to multiply the frequency of the applied input signal by a factor of 100. Thus, signals having frequencies of 2020 kilocycles and 2000 kilocycles are developed at the respective output sides of the two multipliers 77 and 78. These signals are impressed upon opposite sets of input terminals of a mixer 79 so that the difference frequency signal of 20 kilocycles is developed across the output terminals of this mixer. This difference frequency signal is selectively passed by a sharply tuned filter 83 and impressed across the fixed contacts 89 of the switch 86. The purpose of this switch is to selectively connect the phase meter 85 to the output terminals of the filters 82 and 83 to measure the phase relationship between the two 20 kilocycle signals respectively impressed across the contacts 88 and 89 and to measure the phase relationship between the two 0.2 kilocycle signals appearing at the output sides of the filters 81 and 84 and respectively impressed across the two sets of contacts 87 and 90.

From the above explanation it will be understood that the 20 and 0.2 kilocycle signals transmitted to the receiving unit 13C as phase modulation components of the wave radiated by the transmitter 60 are reference signals relative to which the 20 and 0.2 kilocycle signals developed locally in the receiving unit 13C may be phase compared by means of the phase meter 85. Thus by operating the movable contact elements of the switch 86 to engage the contacts 87 and 90, the 0.2 kilocycle difference frequency signal developed through the operation of the receivers 74 and 75, the mixer 76 and the filter 84 may be phase compared with the 0.2 kilocycle reference signal detected by the phase modulation receiver 80 and passed by the filter 81. Alternatively, by operating the switch 86 to engage the movable contacts thereof with the stationary contacts 88 and 89, the 20 kilocycle difference frequency signal developed through the operation of the receivers 74 and 75, the frequency multipliers 77 and 78, the mixer 79 and the filter 83, may be phase compared with the 20 kilocycle reference signal detected by the phase modulation receiver 80 and passed by the filter 82.

Phase comparison of the two 0.2 kilocycle signals results in operation of the phase meter 85 to produce an indication approximately representative of the distance of the receiving unit 13C from the transmitting unit 10A, whereas phase comparison of the 20 kilocycle signals results in operation of the phase meter 85 to produce an indication accurately representative of the distance of the receiving unit 13C from the transmitting unit 10A. In this regard, it is pointed out that the indication provided by measuring the phase relationship between the 0.2 kilocycle signals identifies the position of the receiving unit relative to a pair of hyperbolic equiphase lines, the spacing of which is determined by the wave length of the mean frequency between the 20 and 20.2 kilocycle amplitude modulation components of the waves radiated by the transmitters 60 and 72. In other words, the indicating range of the meter 85 in terms of distance is approximately four and one-half miles and the error of the indication in terms of distance may be considerable. The indication provided by measuring the phase angle between 20 and 20.2 kilocycle signals, on the other hand, is one hundred times more accurate. Thus, the frequency multipliers 67, 68, 77, and 78 in multiplying the frequencies of the 20 and 20.2 kilocycle amplitude modulation components up to values of 2000 and 2020 kilocycles to produce the 20 kilocycle difference frequency signals have the effect of narrowing the distance indicating range of the meter 85 to one percent of the distance range of the same meter when responding to the 0.2 kilocycle signals, with a corresponding increase in accuracy. The effect is the same as would be obtained by heterodyning carrier or modulation components of radiated waves at frequencies of 2000 and 2020 kilocycles. As a result, the distance indicating range of the meter 85 is reduced to approximately 245 feet, which, however, is substantially greater than the possible error in the distance indications obtained by phase comparison of the two 0.2 kilocycle signals.

From the above explanation, it will be apparent that the present invention affords a satisfactory solution to the problem of position finding with a high degree of accuracy. Further, the indications produced through operation of the system are without ambiguity and may readily be converted to position data by an unskilled operator of the receiving units. The two modified systems of Figs. 2A, 3A, 4 and 5 are further characterized by the desirable feature of minimizing the number of channels required for a complete system. The systems disclosed all have the advantage that standard and well known components may be employed throughout, as regards both the transmitting and receiving equipment, and the further advantage that the receiving units may be easily operated by non-technical personnel to provide direct readings.

While different embodiments of the invention have been described, it will be understood that various modifications may be made therein which are within the true spirit and scope of the invention as defined in the appended claims.

What is desired to be secured by Letters Patent of the United States is:

1. In a position determining system, spaced transmitters for radiating modulated carrier waves, means at a receiving point responsive to the carrier components of said waves for providing one indication representative of the position of said receiving point relative to at least one of said transmitting points, and means at said receiving point responsive to the modulation components of said waves for providing a second indication representative of the position of said receiving point relative to at least one of said transmitting points.

2. In a position determining system, spaced transmitters for radiating waves each comprising carrier and modulation components, means at a receiving point responsive to corresponding components of said waves for providing one indication approximately representative of the position of said receiving point relative to at least one of said transmitters, and means at said receiving point responsive to the other components of said waves for providing a second indication more accurately representative of the position of said receiving point relative to at least one of said transmitting points.

3. In a position determining system, spaced transmitters for radiating waves at least a portion of which comprise two different components, means at a receiving point responsive to corresponding components of said waves for providing an indication which represents within a predetermined range the position of said receiving point relative to at least one of said transmitters, and means at said receiving point responsive to the other components of said waves for providing a second indication accurately representative of the position of said receiving point within said predetermined range, thereby accurately to define the position of said receiving point relative to said one transmitter.

4. In a position determining system, transmitters for radiating waves at spaced transmitting points at least a portion of which comprise carrier and modulation components, means at a receiving point responsive to the modulation components of said waves for providing one indication approximately representative of the position of said receiving point relative to at least one of said transmitting points, and means at said receiving point responsive to the carrier components of said waves for providing a second indication which when considered with said one indication accurately defines the position of said receiving point relative to said one transmitting point.

5. In a position determining system, spaced transmitters for radiating waves each comprising carrier and modulation components, means at a receiving point responsive to the modulation components of said waves for providing an indication which represents within a predetermined range the position of said receiving point relative to at least one of said transmitters, and means at said receiving point responsive to the carrier components of said waves for providing a second indication accurately representative of the position of said receiving point within said predetermined range, thereby accurately to define the position of said receiving point relative to said one transmitter.

6. In a position determining system having a receiving point, a pair of spaced transmitters for radiating modulated carrier waves having carrier components of different frequencies and modulation components of different frequencies, means for heterodyning the modulation components of said waves to produce a beat frequency signal and for transmitting to said receiving point a first signal representative of said beat frequency signal, means for heterodyning the carrier frequency components of said waves to produce a carrier beat frequency signal and for transmitting to said receiving point a second signal representative of said carrier beat frequency signal, and means at said receiving point jointly responsive to said first and second signals and the modulated carrier waves radiated from said transmitters to said receiving point for accurately indicating the position of said receiving point relative to at least one of said transmitters.

7. In a position determining system having a receiving point, a pair of spaced transmitters for radiating modulated carrier waves having carrier components of different frequencies and modulation components of different frequencies, means for heterodyning the modulation components of said waves to produce a beat frequency signal and for transmitting to said receiving point a first signal representative of said beat frequency signal, means for heterodyning the carrier frequency components of said waves to produce a carrier beat frequency signal and for transmitting to said receiving point a second signal representative of said carrier beat frequency signal, means at said receiving point jointly responsive to said first signal and the modulation components of the waves transmitted to said receiving point from said transmitters for providing one indication of the position of said receiving point relative to at least one of said transmitters, and means at said receiving point jointly responsive to said second signal and the carrier components of the waves transmitted to said receiving point from said transmitters for providing a second indication of the position of said receiving point relative to said one transmitter.

8. In a position determining system having a receiving point, a pair of spaced transmitters for radiating modulated carrier waves having carrier components of different frequencies and modulation components of different frequencies, means for heterodyning the modulation components of said waves to produce a beat frequency signal and for transmitting to said receiving point a first signal representative of said beat frequency signal, means for heterodyning the carrier frequency components of said waves to produce a carrier beat frequency signal and for transmitting to said receiving point a second signal representative of said carrier beat frequency signal, means at said receiving point jointly responsive to said first signal and the modulation components of the waves transmitted to said receiving point from said transmitters for providing an indication which represents within a predetermined range the position of said receiving point and at least one of said transmitters, and means at said receiving point jointly responsive to said second signal and the carrier components of the waves transmitted to said receiving point from said transmitters for producing a second indication accurately representative of the position of said receiving point within the predetermined range, thereby accurately to define the position of said receiving point relative to said one transmitter.

9. In a position determining system having a receiving point, a pair of spaced transmitters for radiating modulated carrier waves having carrier components of different frequencies and modulation components of different frequencies, means for heterodyning the modulation components of said waves to produce a difference frequency signal and for transmitting to said receiving point a first signal representative of said difference frequency signal, means for heterodyning the carrier frequency components of said waves to produce a carrier difference frequency and for transmitting to said receiving point a second signal representative of said carrier difference frequency, means at said receiving point for receiving said waves and heterodyning the modulation components thereof to produce a third signal having a frequency equaling the frequency of said first signal and related to the difference between the frequencies of said modulation components, means at said receiving point for receiving said waves and heterodyning the carrier components thereof to produce a fourth signal having a frequency equaling the frequency of said second signal and related to the difference between the frequencies of said carrier components, and phase measuring means at said receiving point for comparing the phase of said first and third signals and said second and fourth signals to provide two indications representative of the position of said receiving point relative to at least one of said transmitters.

10. In a position determining system having a receiving point, a pair of spaced transmitters for radiating modulated carrier waves having carrier components of different frequencies and modulation components of different frequencies, means for heterodyning the modulation components of said waves to produce a difference frequency signal for transmitting to said receiving point a first signal representative of said difference frequency signal, means for heterodyning the carrier frequency components of said waves to produce a carrier difference frequency and for transmitting to said receiving point a second signal representative of said carrier difference frequency, means at said receiving point for receiving said waves and heterodyning the modulation components thereof to produce a third signal having a frequency equaling the frequency of said first signal and related to the difference between the frequencies of said modulation components, means at said receiving point for receiving said waves and heterodyning the carrier components thereof to produce a fourth signal having a frequency equaling the frequency of said second signal and related to the difference between the frequencies of said carrier components, and phase measuring means at said receiving point for comparing the phase of said first and third signals to provide an indication which represents within a predetermined range the position of said receiving point relative to at least one of said transmitters and for comparing the phase of said second and fourth signals to provide a second indication accurately representative of the position of said receiving point within said predetermined range, thereby accurately to determine the position of said receiving point relative to said one transmitter.

11. In a position determining system having a receiving point, a pair of spaced transmitters for radiating high frequency waves to produce standing waves in space characterized by a plurality of spaced hyperbolic equiphase lines, means for heterodyning said waves and for transmitting to said receiving point a signal representative of a beat frequency between the frequencies of said waves, means at said receiving point jointly responsive to said signal and the waves radiated from said transmitters for providing an indication representative of the position of said receiving point relative to one of said equiphase lines, and additional position indicating means at said receiving point for providing an indication identifying said one equiphase line.

12. In a position determining system having a receiving point, a pair of spaced transmitters for radiating high frequency waves to produce standing waves in space characterized by a plurality of spaced hyperbolic equiphase lines, means for heterodyning said waves and for transmitting to said receiving point a signal representative of a beat frequency between the frequencies of said waves, means at said receiving point jointly responsive to said signal and the waves radiated from said transmitters for providing an indication representative of the position of said receiving point relative to one of said equiphase lines, and additional position indicating means at said receiving point at least partially responsive to said waves for providing an indication identifying said one equiphase line.

13. In a position determining system having a receiving point, a pair of spaced transmitters for radiating modulated carrier waves having carrier components of different frequencies and modulation components of different frequencies, thereby to produce two sets of standing waves in space respectively characterized by a plurality of spaced equiphase lines the spacings of which are respectively related to the wave lengths of said carrier and modulation components, means for heterodyning the modulation components of said waves to produce a beat frequency signal and for transmitting to said receiving point a first signal representative of said beat frequency signal, means for heterodyning the carrier frequency components of said waves to produce a carrier frequency beat signal and for transmitting to said receiving point a second signal representative of said carrier frequency beat signal, means at said receiving point jointly responsive to said second signal and to the carrier components of said waves for providing an indication representative of the position of said receiving point relative to one of the equiphase lines in one of said sets, and means at said receiving point jointly responsive to said first signal and to the modulation components of said waves for providing a second indication representative of the position of said receiving point relative to one of the equiphase lines in the other of said sets, thereby to identify the one equiphase line in said one set relative to which the position of said receiving point is indicated by said one indication.

14. In a position determining system having a receiving point, a pair of spaced transmitters for radiating modulated carrier waves having carrier components of different frequencies and modulation components of different frequencies, thereby to produce two sets of standing waves in space respectively characterized by a plurality of spaced equiphase lines the spacings of which are respectively related to the wave lengths of said carrier and modulation components, means at said receiving point responsive to the carrier components of said waves for providing an indication representative of the position of said receiving point relative to one of the equiphase lines in one of said sets, and means at said receiving point responsive to the modulation components of said waves for providing a second indication representative of the position of said receiving point relative to one of the equiphase lines in the other of said sets, thereby to identify the one equiphase line of said one set relative to which the position of said receiving point is indicated by said one indication.

15. In a position determining system having a receiving point, a pair of spaced transmitters for radiating waves each having a first component and a second component, the first components of said waves having different frequencies and the second components of said waves having different frequencies, means for heterodyning the first components of said waves to produce a beat frequency signal and for transmitting to said receiving point a first signal representative of said beat frequency signal, means for heterodyning the second components of said waves to produce a beat frequency signal and for transmitting to said receiving point a second signal representative of said last-named beat frequency signal, and means at said receiving point jointly responsive to said first and second signals and the waves radiated from said transmitters to said receiving point for accurately indicating the position of said receiving point relative to at least one of said transmitters.

16. In a position determining system having a receiving point, a pair of spaced transmitters for radiating waves each having a first component and a second component, the first components of said waves having different frequencies and the second components of said waves having different frequencies, means for heterodyning the first components of said waves to produce a beat frequency signal and for transmitting to said receiving point a first signal representative of said beat frequency signal, means for heterodyning the second components of said waves to produce a beat frequency signal and for transmitting to said receiving point a second signal representative of said last-named beat frequency signal, means at said receiving point jointly responsive to said first signal and the first components of the waves transmitted to said receiving point from said transmitters for providing one indication of the position of said receiving point relative to at least one of said transmitters, and means at said receiving point jointly responsive to said second signal and the second components of the waves transmitted to said receiving point from said transmitters for providing a second indication of the position of said receiving point relative to said one transmitter.

17. In a position determining system having a receiving point, a pair of spaced transmitters for radiating waves each having a first component and a second component, the first components of said waves having different frequencies and the second components of said waves having different frequencies, means for heterodyning the first components of said waves to produce a difference frequency signal and for transmitting to said receiving point a first signal representative of said difference frequency signal, means for heterodyning the second components of said waves to produce a difference frequency signal and for transmitting to said receiving point a second signal representative of said last-named difference frequency signal, means at said receiving point for receiving said waves and heterodyning the first components thereof to produce a third signal having a frequency equaling the frequency of said first signal and related to the difference between the frequencies of said first components, means at said receiving point for receiving said waves and heterodyning the second components thereof to produce a fourth signal having a frequency equaling the frequency of said second signal and related to the difference between the frequencies of said second components, and phase measuring means at said receiving point for comparing the phase of said first and third signals and said second and fourth signals to provide two indications representative of the position of said receiving point relative to at least one of said transmitters.

18. In a position determining system having a receiving point, a pair of transmitters for radiating modulated carrier waves having modulation components of different frequencies, each of said transmitters comprising a carrier wave generator and a modulation wave generator, means responsive to wave energy derived from said modulation wave generators for producing a signal representative of a beat frequency between the modulation components of said waves and for transmitting said signal to said receiving point, and means at said receiving point jointly responsive to said signal and said waves for producing an indication representative of the position of said receiving point relative to at least one of said transmitters.

19. In a position determining system having a receiving point, a pair of spaced transmitters for radiating modulated carrier waves having modulation components of different frequencies, means for heterodyning the modulation components of said waves to produce a beat frequency signal and for transmitting to said receiving point a signal representative of said beat frequency signal, and means at said receiving point jointly responsive to said signal and said waves for producing an indication representative of the position of said receiving point relative to at least one of said transmitters.

20. In a position determining system having a receiving point, a pair of transmitters for radiating modulated carrier waves having modulation components of different frequencies, each of said transmitters comprising a carrier wave generator and a modulation wave generator, means responsive to wave energy derived from said modulation wave generators for producing a signal representative of a beat frequency between the modulation components of said waves and for transmitting said signal to said receiving point, and means at said receiving point jointly responsive to said signal and the modulation components of said waves for producing an indication representative of the position of said receiving point relative to at least one of said transmitters.

21. In a position determining system having a receiving point, a pair of transmitters for radiating modulated carrier waves having modulation components of different frequencies, each of said transmitters comprising a carrier wave generator and a modulation wave generator, means responsive to wave energy derived from said modulation wave generators for producing a first signal representative of a beat frequency between the modulation components of said waves and for transmitting said signal to said receiving point, receiving means at said receiving point responsive to said waves for producing a second signal representative of a beat frequency between the modulation components of said waves, other receiving means at said receiving point for receiving and detecting said first signal, and phase measuring means jointly responsive to said first and second signals for producing an indication representative of the position of said receiving point relative to at least one of said transmitters.

22. In a position determining system having a receiving point, a pair of spaced transmitters for radiating modulated carrier waves having modulation components of different frequencies, a means for heterodyning the modulation components of said waves to produce a first beat frequency signal and for transmitting said signal to said receiving point, receiving means at said receiving point for receiving said waves and heterodyning the modulation components thereof to produce a second beat frequency signal, other receiving means at said receiving point for receiving and detecting said first signal, and phase measuring means at said receiving point responsive to the phase relationship between said first and second signals for producing an indication representative of the position of said receiving point relative to at least one of said transmitters.

23. In a position determining system having a receiving point, a pair of spaced transmitters for radiating modulated carrier waves having modulation components of different frequencies, means located in proximity to one of said transmitters for heterodyning the modulation components of said waves to produce a first beat frequency signal and for modulating said signal upon the carrier wave transmitted by said one transmitter for transmission to said receiving point, receiving means at said receiving point for receiving said waves and heterodyning said modulation components thereof of different frequencies to produce a second beat frequency signal, other receiving means at said receiving point for receiving the modulated carrier wave from said one transmitter and for detecting and selecting said first beat frequency signal, and phase measuring means at said receiving point responsive to the phase relationship between said first and second signals for producing an indication representative of the position of said receiving point relative to at least one of said transmitters.

24. In a position determining system, a pair of spaced transmitters for radiating modulated carrier waves having modulation components of different frequencies, each of said transmitters including a carrier wave generator and a modulation wave generator, and means responsive to wave energy derived from said modulation wave generators for producing a signal representative of a beat frequency between the modulation components of said waves and for combining said signal with a carrier wave for space radiation.

25. In a position determining system, a pair of spaced transmitters for radiating modulated carrier waves having modulation components of different frequencies, each of said transmitters including a carrier wave generator and a modulation wave generator, and means responsive to wave energy derived from said modulation wave generators for producing a signal representative of a beat frequency between the modulation components of said waves and for modulating said signal upon the carrier wave output of one of said carrier wave generators.

26. In a position determining system, a pair of spaced transmitters for radiating modulated carrier waves having modulation components of different frequencies, and means for heterodyning the modulation components of said waves to produce a signal representative of a beat frequency between the modulation components of said waves and for combining said signal with a carrier wave for space radiation.

27. In a position determining system, a pair of spaced transmitters for radiating modulated carrier waves having modulation components of different frequencies, and means located in proximity to one of said transmitters for heterodyning the modulation components of said waves to produce a signal representative of a beat frequency between the modulation components of said waves and for modulating said signal upon the carrier output of said one transmitter for space radiation.

28. In a position determining system, a pair of spaced transmitters for radiating modulated carrier waves having modulation components of different frequencies, each of said transmitters including a carrier wave generator, a modulation wave generator and means for modulating the carrier wave output of the carrier wave generator with the modulation wave output of the modulation wave generator, and means responsive to wave energy derived from said modulation wave generators for producing a signal representative of a beat frequency between the modulation components of said waves and for differently modulating said signal upon the carrier wave output of one of said transmitters for space radiation.

29. In a position determining system, a pair of spaced transmitters for radiating modulated carrier waves having modulation components of different frequencies, each of said transmitters including a carrier wave generator, a modulation wave generator and means for amplitude modulating the carrier wave output of the carrier wave generator with the modulation wave output of the modulation wave generator, and means responsive to wave energy derived from said modulation wave generators for producing a signal representative of a beat frequency between the modulation components of said waves and for phase modulating said signal upon the carrier wave output of one of said transmitters for space radiation.

30. In a position determining system, a pair of spaced transmitters for radiating amplitude modulated carrier waves having modulation components of different frequencies, and means located in proximity to one of said transmitters for heterodyning the modulation components of said waves to produce a signal representative of a beat frequency between the modulation components of said waves and for phase modulating said signal upon the carrier output of said one transmitter for space radiation.

31. In a position determining system, a pair of transmitters for radiating modulated carrier waves having carrier components of different frequencies and modulation components of different frequencies, each of said transmitters comprising a carrier wave generator and a modulation wave generator, means responsive to wave energy derived from said modulation wave generators for producing a first signal representative of a beat frequency between the modulation components of said waves and for modulating said signal upon the carrier wave output of one of said transmitters, and means responsive to wave energy derived from said carrier wave generators for producing a second signal representative of a beat frequency between the carrier components of said waves and for modulating said second signal upon the carrier wave output of one of said transmitters.

32. In a position determining system, a pair of transmitters for radiating modulated carrier waves having carrier components of different frequencies and modulation components of different frequencies, each of said transmitters comprising a carrier wave generator and a modulation wave generator, means responsive to wave energy derived from said modulation wave generators for producing a first signal representative of the difference frequency between the modulation components of said waves and for modulating said signal upon the carrier wave output of one of said transmitters, and means responsive to wave energy derived from said carrier wave generators for producing a second signal representative of the difference frequency between the carrier components of said waves and for modulating said second signal upon the carrier wave output of one of said transmitters, said first and second signals being distinguishable on a frequency selective basis and being modulated upon the carrier wave output of the same one of said pair of transmitters.

33. In a position determining system, a pair of transmitters for radiating modulated carrier waves having carrier components of different frequencies and modulation components of different frequencies, means responsive to said radiated waves for heterodyning the modulation components thereof to produce a first signal representative of the difference frequency between the modulation components of said waves and for modulating said signal upon the carrier wave output of one of said transmitters, and means responsive to said radiated waves for heterodyning the carrier components thereof to produce a second signal representative of the difference frequency between the carrier components of said waves and for modulating said second signal upon the carrier wave output of one of said transmitters.

34. In a position determining system, a pair of transmitters for radiating modulated carrier waves having carrier components of different frequencies and modulation components of different frequencies, means responsive to said radiated waves for heterodyning the modulation components thereof to produce a first signal representative of the difference frequency between the modulation components of said waves and for modulating said signal upon the carrier wave output of one of said transmitters, and means responsive to said radiated waves for heterodyning the carrier components thereof to produce a second signal representative of the difference frequency between the carrier components of said waves and for modulating said second signal upon the carrier wave output of one of said transmitters, said first and second signals being distinguishable on a frequency selective basis and being modulated upon the carrier wave output of the same one of said transmitters.

35. In a position determining system, a pair of transmitters for radiating amplitude modulated carrier waves having carrier components of different frequencies and modulation components of different frequencies, means located in proximity to one of said transmitters and responsive to said radiated waves for heterodyning the modulation components thereof to produce a first signal representative of the difference frequency between the modulation components of said waves and for phase modulating said signal upon the carrier wave output of said one transmitter, and means also located in proximity to said one transmitter and responsive to said radiated waves for heterodyning the carrier components of said waves to produce a second signal representative of the difference frequency between the carrier components of said waves and for phase modulating said second signal upon the carrier wave output of said one transmitter, said first and second signals being distinguishable on a frequency selective basis.

36. In a position determining system, a pair of spaced transmitters for radiating waves each having a first component and a second component, the first components of said waves having different frequencies and the second components of said waves having different frequencies, means for heterodyning the first components of said waves to produce a first signal representative of a beat frequency of said first components and for modulating said first signal upon the wave radiated by one of said transmitters, and means for heterodyning the second components of said waves to produce a second signal representative of a beat frequency of said second components and for modulating said second signal upon the wave output of one of said transmitters.

37. In a position determining system, a pair of spaced transmitters for radiating waves each having a first component and a second component, the first components of said waves having different frequencies and the second components of said waves having different frequencies, means for heterodyning the first components of said waves to produce a first signal representative of a beat frequency of said first components and for modulating said first signal upon the wave radiated by one of said transmitters, and means for heterodyning the second components of said waves to produce a second signal representative of a beat frequency of said second components and for modulating said second signal upon the wave output of one of said transmitters, said first and second signals being distinguishable on a frequency selective basis and being modulated upon the wave output of the same one of said transmitters.

38. In a position determining system having a receiving point, spaced transmitters for radiating waves to said receiving point having different frequencies, means excited by and responsive to said waves for developing a pair of distinguishable signals each having a frequency related to a beat frequency between said waves and for radiating said signals to said receiving point, and means at said receiving point jointly responsive to said pair of signals and the waves radiated to said receiving point from said transmitters for producing two indications of the position of said receiving point relative to at least one of said transmitters.

39. In a position determining system having a receiving point, spaced transmitters for radiating waves to said receiving point having different frequencies, means excited by and responsive to said waves for developing a pair of distinguishable signals each having a frequency related to a beat frequency between said waves and for radiating said signals to said receiving point, means at said receiving point excited by and responsive to said waves for developing a second pair of signals having frequencies respectively equaling the frequencies of said first-named pair of signals, means at said receiving point for receiving and detecting said pair of signals, and phase measuring means at said receiving point for measuring the phase relationship between the signals of said pairs which have like frequencies, thereby to provide two indications of the position of said receiving point relative to at least one of said transmitters.

40. In a position determining system having a receiving point, spaced transmitters for radiating waves having certain components of different frequencies, means for receiving said waves and detecting said components thereof, means excited by and responsive to said detected components of said waves for developing a first signal having a frequency related to the difference frequency between the frequencies of said components and for radiating said signal to said receiving point, means excited by and responsive to said detected waves for developing a second signal having a frequency distinguishable from said first signal and also related to the difference frequency between the frequencies of said components and for radiating said second signal to said receiving point, and means at said receiving point jointly responsive to said first and second signals and the waves radiated from said transmitters to said receiving point for producing two indications of the position of said receiving point relative to at least one of said transmitters.

41. In a position determining system, having a receiving point, spaced transmitters for radiating waves having certain components of different frequencies, means for receiving said waves and detecting said components thereof, means excited by and responsive to said detected components of said waves for developing a first signal having a frequency related to the difference frequency between the frequencies of said components and for radiating said signal to said receiving point, means excited by and responsive to said detected waves for developing a second signal having a frequency distinguishable from said first signal and also related to the difference frequency between the frequencies of said components and for radiating said second signal to said receiving point, means at said receiving point for receiving said waves and detecting said components thereof, means at said receiving point excited by and responsive to said detected components of said waves for developing third and fourth signals having frequencies respectively equaling the frequencies of said first and second signals, means at said receiving point for receiving and detecting said first and second signals, and phase measuring means at said receiving point for measuring the phase relationship between said first and third signals and said second and fourth signals to provide two indications of the position of said receiving point relative to at least one of said transmitters.

42. In a position determining system having a receiving point, spaced transmitters for radiating waves to said receiving point having modulation components of different frequencies, means for receiving said waves and detecting said modulation components thereof, means including a mixer excited by said detected modulation components for developing a first signal having a frequency equaling the difference frequency between the frequencies of said modulation components and for radiating said signal to said receiving point, means including frequency multiplying and mixing stages excited by said detected modulation components for developing a second signal having a frequency greater than the frequency of said first signal and for radiating said second signal to said receiving point, means at said receiving point for receiving and detecting said first and second signals and the modulation components of said waves, and means at said receiving point jointly responsive to said signals and the detected modulation components of said waves for producing two indications of the position of said receiving point relative to at least one of said transmitters.

43. In a position determining system having a receiving point, spaced transmitters for radiating waves to said receiving point having modulation components of different frequencies, means for receiving said waves and detecting said modulation components thereof, means including a mixer excited by said detected modulation components for developing a first signal having a frequency equaling the difference frequency between the frequencies of said modulation components and for radiating said signal to said receiving point, means including frequency multiplying and mixing stages excited by said detected modulation components for developing a second signal having a frequency greater than the frequency of said first signal and for radiating said second signal to said receiving point, means at said receiving point for receiving and detecting said first and second signals and the modulation components of said waves, means at said receiving point including a mixer excited by said detected modulation components for developing a third signal having a frequency equaling the frequency of said first signal, means at said receiving point including frequency multiplying and mixer stages excited by said detected modulation components for developing a fourth signal having a frequency equaling the frequency of said second signal, and phase measuring means at said receiving point for measuring the phase relationship between said first and third signals and said second and fourth signals to provide two indications of the position of said receiving point relative to at least one of said transmitters.

44. In a position determining system having a receiving point, spaced transmitters for radiating amplitude modulated carrier waves to said receiving point having modulation components of different frequencies, means for receiving said waves and detecting said modulation components thereof, means including a mixer excited by said detected modulation components for developing a first signal having a frequency equaling the difference frequency between the frequencies of said modulation components and for phase modulating said signal upon the carrier output of one of said transmitters for radiation to said receiving point, means including frequency multiplying and mixing stages excited by said detected modulation components for developing a second signal having a frequency greater than the frequency of said first signal and for phase modulating said second signal upon the carrier output of said one transmitter for radiation to said receiving point, phase and amplitude modulation receivers at said receiving point for receiving and detecting said first and second signals and the amplitude modulation components of said waves, and means at said receiving point jointly responsive to said signals and the detected modulation components of said waves for producing two indications of the position of said receiving point relative to at lease one of said transmitters.

45. In a position determining system having a receiving point, spaced transmitters for radiating amplitude modulated carrier waves to said receiving point having modulation components of different frequencies, means for receiving said waves and detecting said modulation components thereof, means including a mixer excited by said detected modulation components for developing a first signal having a frequency equaling the difference frequency between the frequencies of said modulation components and for phase modulating said signal upon the carrier output of one of said transmitters for radiation to said receiving point, means including frequency multiplying and mixing stages excited by said detected modulation components for developing a second signal having a frequency greater than the frequency of said first signal and for phase modulating said second signal upon the carrier output of said one transmitter for radiation to said receiving point, a phase modulation receiver at said receiving point for detecting said first and second signals, amplitude modulation receivers at said receiving point for separately receiving and detecting the amplitude modulation components of the waves radiated to said receiving point from said transmitters, means at said receiving point including a mixer excited by said detected amplitude modulation components for developing a third signal having a frequency equaling the frequency of said first signal, frequency multiplying and mixing stages at said receiving point excited by said detected amplitude modulation components for developing a fourth signal having a frequency equaling the frequency of said second signal, and phase measuring means at said receiving point for measuring the phase relationship between said first and third signals and said second and fourth signals to provide two indications of the position of said receiving point relative to at least one of said transmitters.

46. A transmission system for transmitting position indicating signals, comprising a pair of spaced transmitters for radiating amplitude modulated carrier waves having modulation components of different frequencies, means for receiving said waves and detecting said modulation components thereof, means including a mixer excited by said detected modulation components for developing a first signal having a frequency equaling the difference frequency between the frequencies of said modulation components and for phase modulating said first signal upon the carrier output of one of said transmitters for radiation, and means including frequency multiplying and mixing stages excited by said detected modulation components for developing a second signal having a frequency greater than the frequency of said first signal and for phase modulating said second signal upon the carrier output of said one transmitter for radiation.

47. A transmission system for transmitting position indicating signals, comprising a pair of spaced transmitters for radiating modulated carrier waves having modulation components of different frequencies, means for receiving said waves and detecting said modulation components thereof, means including a mixer excited by said detected modulation components for developing a first signal having a frequency related to the difference frequency between the frequencies of said modulation components and for modulating said first signal upon a carrier wave for space radiation, and means including frequency converting and mixing stages excited by said detected modulation components for developing a second signal having a frequency related to the difference frequency between the frequencies of said modulation components but distinguishably different from said first signal and for modulating said second signal upon a carrier wave for space radiation.

48. A wave signal receiving system for translating received signal modulated waves into position indications, comprising means for receiving and detecting first and second reference signals having widely different frequencies, means for receiving and detecting the modulation components of two modulated waves, means including a mixer excited by said detected modulation components for developing a third signal having a frequency equaling the frequency of said first reference signal, means including frequency converting and mixing stages for developing a fourth signal having a frequency equaling the frequency of said second reference signal, and phase measuring means for measuring the phase relationship between said first and third signals and said second and fourth signals to provide two position indications.

49. A wave signal receiving system for translating received space radiated waves into position indications, comprising means for receiving and reproducing first and second reference signals having frequencies differently related to the difference frequency between a pair of spaced radiated waves, receiving and translating means for receiving and converting said pair of space radiated waves into third and fourth signals having frequencies respectively equaling the frequencies of said first and second reference signals, and phase measuring means for measuring the phase relationship between said first and third signals and said second and fourth signals to provide two position indications.

50. A wave signal receiving system for translating received space radiated waves into position indications, comprising means for receiving and reproducing a reference signal having a frequency representative of the difference frequency between the modulation frequencies of a pair of space radiated waves having modulation components, receiving and translating apparatus for receiving said pair of space radiated waves and heterodyning the modulation components thereof to produce a signal having a frequency equaling the frequency of said reference signal, and phase measuring means or measuring the phase relationship between said signals to provide an indication of the position of said receiving system relative to the point of radiation of at least one of said space radiated waves.

51. In a position determining system having a receiving point, a pair of spaced transmitters for radiating high frequency waves to produce standing waves in space characterized by spaced equiphase lines, means for heterodyning said waves to produce a beat frequency signal, means at least in part controlled by said beat frequency signal for transmitting a reference signal to said receiving point, means at said receiving point jointly responsive to said reference signal and the waves radiated from said transmitters for producing an indication representative of the position of said receiving point relative to one of said equiphase lines, and additional position indicating means at said receiving point at least partially responsive to said waves for providing an indication identifying said one equiphase line.

52. In a position determining system having a receiving point, spaced transmitters for radiating waves to said receiving point having different frequencies, means excited by and responsive to said waves for developing a plurality of distinguishable signals each having a frequency related to a beat frequency between a pair of said waves, means controlled by said signals for radiating at least two reference signals to said receiving point, and means at said receiving point jointly responsive to said pair of signals and the waves radiated to said receiving point from said transmitters for producing two indications of the position of said receiving point relative to at least one of said transmitters.

JAMES E. HAWKINS.

REFERENCES CITED

The following references are of record in the file of this patent:

UNITED STATES PATENTS

| Number | Name | Date |
|---|---|---|
| 1,942,262 | Shanklin | Jan. 2, 1934 |
| 2,141,281 | Southworth | Dec. 27, 1938 |
| 2,144,203 | Shanklin | Jan. 17, 1939 |
| 2,148,267 | Honore | Feb. 21, 1939 |
| 2,407,287 | Labin | Sept. 10, 1946 |
| 2,408,773 | Goodall | Oct. 8, 1946 |
| 2,417,807 | Brunner | Mar. 25, 1947 |
| 2,423,305 | Fletcher | July 1, 1947 |

Disclaimer 2,513,315.—*James E. Hawkins*, Tulsa, Okla. RADIO POSITION DETERMINING SYSTEM. Patent dated July 4, 1950. Disclaimer filed Oct. 16, 1951, by the inventor, the assignee, *Seismograph Service Corporation*, assenting.

Hereby enters this disclaimer to claims 1, 2, 3, 4, 5, and 14 of said patent.

[*Official Gazette November 13, 1951.*]